United States Patent
Chen et al.

(10) Patent No.: US 11,589,376 B2
(45) Date of Patent: Feb. 21, 2023

(54) LOW-POWER COEXISTENCE MECHANISM BASED ON PACKET TRAFFIC ARBITRATION

(71) Applicant: MediaTek Inc., Hsinchu (TW)

(72) Inventors: Li-Wei Chen, Hsinchu (TW); Tsai Yuan Hsu, Hsinchu (TW); Shun-Yong Huang, Hsinchu (TW); Chen-Feng Liu, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 106 days.

(21) Appl. No.: 16/935,889

(22) Filed: Jul. 22, 2020

(65) Prior Publication Data

US 2022/0030614 A1    Jan. 27, 2022

(51) Int. Cl.
| | |
|---|---|
| *G08C 17/00* | (2006.01) |
| *H04W 72/12* | (2023.01) |
| *H04W 52/02* | (2009.01) |
| *H04W 72/14* | (2009.01) |

(52) U.S. Cl.
CPC ... *H04W 72/1284* (2013.01); *H04W 52/0216* (2013.01); *H04W 72/1231* (2013.01); *H04W 72/14* (2013.01)

(58) Field of Classification Search
CPC ......... H04W 72/1284; H04W 52/0216; H04W 72/1231; H04W 72/14
USPC ........................................................ 370/311
See application file for complete search history.

(56) References Cited

U.S. PATENT DOCUMENTS

| | | | |
|---|---|---|---|
| 7,778,603 B2 | 8/2010 | Palin | |
| 8,086,213 B1 * | 12/2011 | Wong | H04W 52/0206 455/343.1 |
| 8,472,427 B1 * | 6/2013 | Wheeler | H04W 72/1242 370/348 |
| 8,780,752 B2 | 7/2014 | Linsky | |
| 8,908,667 B1 * | 12/2014 | Wong | H04B 1/04 370/339 |
| 10,433,346 B1 * | 10/2019 | Kencharla | H04W 4/80 |
| 10,856,331 B1 * | 12/2020 | Medapalli | H04W 72/0446 |
| 2010/0202416 A1 * | 8/2010 | Wilhelmsson | H04W 72/1215 370/336 |
| 2011/0310741 A1 * | 12/2011 | Ko | H04W 74/085 370/235 |
| 2013/0064111 A1 * | 3/2013 | Linsky | H04W 72/1215 370/336 |
| 2015/0200692 A1 * | 7/2015 | Chiou | H04B 1/406 370/297 |
| 2017/0290038 A1 * | 10/2017 | Dickey | H04W 72/1215 |
| 2017/0325199 A1 * | 11/2017 | Hirsch | H04W 72/1215 |
| 2018/0004611 A1 * | 1/2018 | Lu | G06F 11/184 |
| 2018/0004614 A1 * | 1/2018 | Lu | G06F 11/2033 |

(Continued)

*Primary Examiner* — Chuong T Ho
(74) *Attorney, Agent, or Firm* — Tong J. Lee (57) ABSTRACT

A multi-radio device includes two or more radio subsystems coupled to a packet traffic arbitration (PTA) module. The PTA module receives a first request for radio communication from a first radio subsystem, where the first request indicates a first usage duration. After granting the first request, the PTA module receives a second request for radio communication from a second radio subsystem. The second request indicates a second usage duration. The PTA module sends a rejection of the second request to the second radio subsystem, where the rejection indicates a remaining time of the first usage duration.

16 Claims, 6 Drawing Sheets

(56) References Cited

U.S. PATENT DOCUMENTS

2019/0335482 A1* 10/2019 Yang .................. H04L 47/2433
2021/0044990 A1* 2/2021 Khawand ................ H04W 4/80

* cited by examiner

LOW-POWER COEXISTENCE MECHANISM BASED ON PACKET TRAFFIC ARBITRATION

TECHNICAL FIELD

Embodiments of the invention relate to wireless communications; more specifically, to packet traffic arbitration in a multi-radio device.

BACKGROUND

Wireless local area networks (WLAN) connect multiple devices via wireless communication within a limited area (e.g., ~100 meters) such as a home, school, laboratory, campus, or office building. A WLAN enables its users to move around within the WLAN area and remain connected to the network. A wireless device in a WLAN can connect to the Internet via a router or an access point. Many modern WLANs are based on the IEEE 802.11 standards, commonly known as Wi-Fi.

Wireless personal area networks (WPANs) provide wireless communication over short distances (e.g., from a few centimeters to a few meters) among a group of devices, such as computers, smartphones, tablets, laptops, headsets, and personal digital assistants (PDAs). A WPAN provides a power-efficient and inexpensive communication mechanism for a wide range of devices. Examples of WPAN protocols include Bluetooth, ZigBee, wireless USB, ultra-wideband (UWB), etc.

Modern communication and computing devices are typically equipped with multiple radios to enable wireless connections according to a variety of radio protocols. For example, a multi-radio device such as a smartphone typically includes radio circuitry for Wi-Fi and Bluetooth connections. In addition, a multi-radio device also typically includes radio circuitry for connecting to broadband wireless networks such as a 4G LTE network and/or a 5G NR network. The radios for different wireless networks co-exist in close physical proximity. The radios in some scenarios may also share the same frequency band. If two or more radios operate simultaneously, they can potentially interfere with each other. For example, when one radio transmits a signal as another radio receives a signal, the received signal may be corrupted by the transmitted signal. There is a need for coexistence of radios to operate in a shared environment of a multi-radio device. Furthermore, there is a need for providing a coexistence mechanism to improve or reduce interference among the radios in a multi-radio device.

SUMMARY

In one embodiment, a multi-radio device includes two or more radio subsystems coupled to a packet traffic arbitration (PTA) module. The PTA module receives a first request for radio communication from a first radio subsystem, the first request indicating a first usage duration. The PTA module grants the first request. The PTA module further receives a second request for radio communication from a second radio subsystem, the second request indicating a second usage duration. The PTA module sends a rejection of the second request to the second radio subsystem, the rejection indicating a remaining time of the first usage duration.

In another embodiment, a method is performed by a device including a PTA module and two or more radio subsystems. The method comprises receiving a first request for radio communication from a first radio subsystem by the PTA module, the first request indicating a first usage duration. The method further comprises granting the first request by the PTA module, and receiving a second request for radio communication from a second radio subsystem by the PTA module, the second request indicating a second usage duration. The method further comprises sending a rejection of the second request to the second radio subsystem, the rejection indicating a remaining time of the first usage duration.

Other aspects and features will become apparent to those ordinarily skilled in the art upon review of the following description of specific embodiments in conjunction with the accompanying figures.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Embodiments of the invention provide a mechanism for a multi-radio device to coordinate the operations of two or more radio subsystems with low power consumption. Active operations of the radio subsystems may interfere with one another, due to shared or neighboring frequency bands, shared antennas, shared RF circuitry, and/or physical proximity. To avoid damage to sensitive circuits in the radio subsystems, only one radio subsystem can be active at a time. That is, when a radio subsystem is engaged in radio communication (i.e., transmitting or receiving signals), the other radio subsystems in the multi-radio device may not transmit or receive at the same time. An example of a sensitive circuit is a low-noise amplifier (LNA), which amplifies a received signal in on radio subsystem and is susceptible to damage by a transmitted signal from another radio subsystem. In the disclosure herein, a radio subsystem is "active" or "in the active mode," which means that the radio subsystem is engaged in radio communication, which also means that the radio subsystem is transmitting or receiving signals.

In one embodiment, the multi-radio device includes a packet traffic arbitration (PTA) module to coordinate the radio communication requests from the radio subsystems. When a first radio subsystem is active, the PTA module may reject requests for radio communication from the other radio subsystems in the device. When a radio subsystem receives a rejection, it enters a sleep mode; e.g., by turning off at least a portion of its circuitry including the sensitive circuits. Thus, the radio subsystem in the sleep mode not only reduces its power consumption but also avoid damage to its sensitive circuits.

In one embodiment, the request from a radio subsystem to the PTA module indicates a usage duration, which is the time period during which the radio subsystem is to be active. For example, when a PTA module grants a first radio subsystem (R1) to transmit or receive, the PTA module keeps track of the remaining time of R1's usage duration. In one embodiment, a second radio subsystem (R2) may submit a request during R1's usage duration. In response, the PTA module rejects R2's request, and informs R2 of R1's remaining time at the time of R2's request. R2 may enter a sleep mode when receiving the rejection from the PTA module. In one embodiment, R2 may enter a sleep mode by turning off its radio frequency (RF) frontend circuitry and physical layer (PHY) circuitry. R2 may keep the media access control (MAC) circuitry on, so that no backup and restore are necessary when entering and exiting the sleep mode, respectively. R2 may wake up from the sleep mode at the end or near the end of R1's usage duration, and re-submit a request to the PTA module for radio communication (i.e., transmission or reception).

The disclosed method, as well as the device and the processing circuitry implementing the method, can be applied to wireless communication across a wide range of wireless networks. Although specific wireless networks such as WLANs and WPANs are described as examples, it is understood that a multi-radio device according to the embodiments of the invention may operate in any wireless networks not limited to the examples provided herein.

Figure 1:
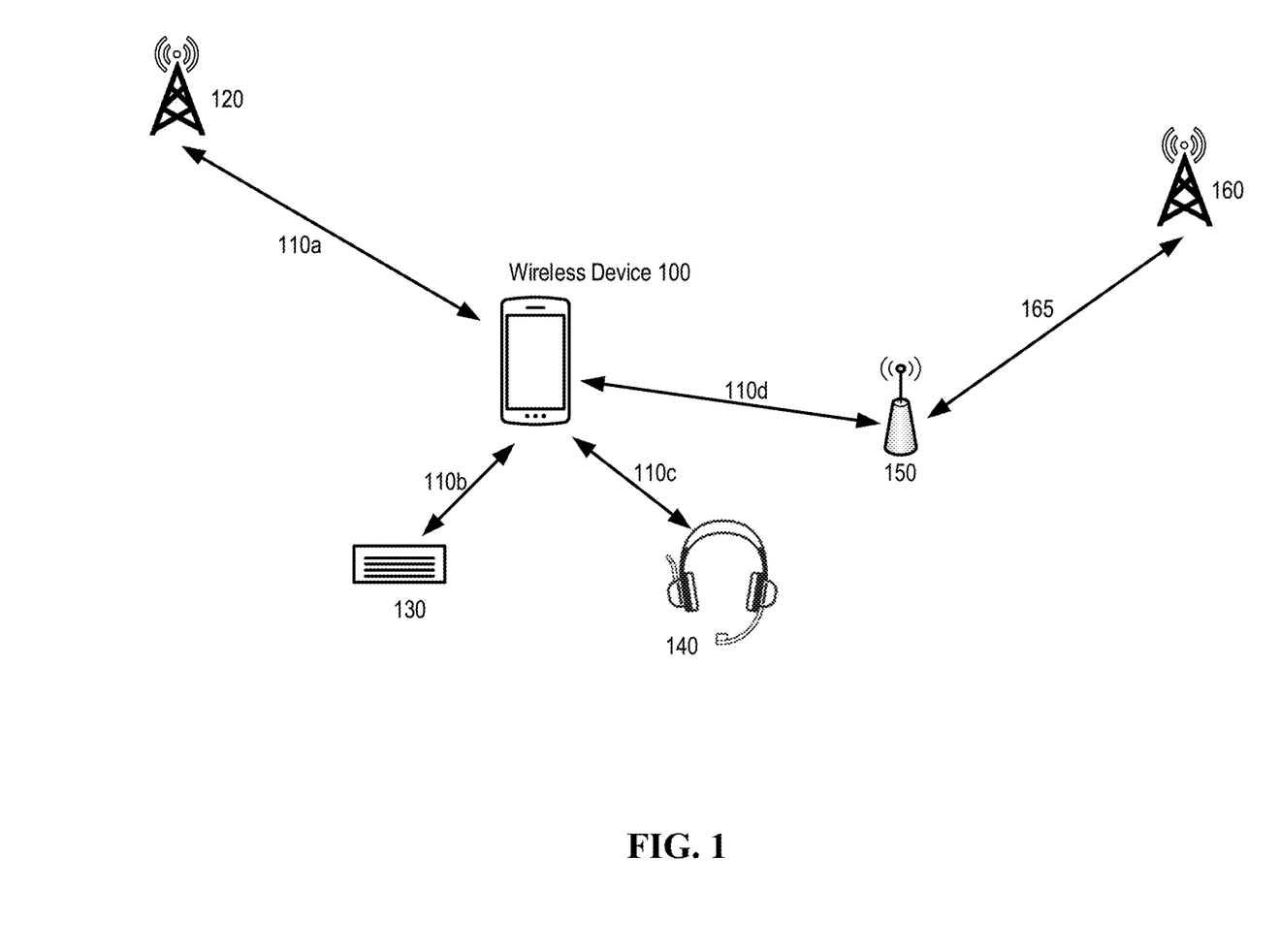
FIG. 1 illustrates a wireless device adaptive to operate in multiple wireless networks according to one embodiment.

FIG. 1 is a diagram illustrating a wireless device 100 which operates in multiple wireless networks according to one embodiment. For example, the wireless device 100 may form a wireless connection 110a to a base station 120, a wireless connection 110b to a wireless keyboard 130, a wireless connection 110c to a wireless headset 140, and/or a wireless connection 110d to a wireless router 150 which is further connected via a connection 165 to a base station 160. One or both of the base stations 120 and 160 may be a gNodeB in a 5G NR network or another broadband wireless network. The wireless connections 110b and 110c may be connections in a WPAN such as Bluetooth connections. The wireless connection 110d may be a connection in a WLAN such as a Wi-Fi connection. One of ordinary skill in the art would understand that the methods and apparatuses described herein may be applicable to a wide range of other multi-access technologies and the telecommunication standards that employ these technologies. It is also understood that the wireless device 100 may form additional wireless connections, few wireless connections, alternative wireless connections in an arrangement different from what is shown in FIG. 1 and according to a wide range of other wireless communication protocols; e.g.; wireless USB, UWB, WiMax, ZigBee, etc.

Examples of the wireless device 100 may include a cellular phone (e.g., a smartphone), a wireless communication device, a handheld device, a laptop computer, a tablet, a gaming device, a wearable device, an entertainment device, an infotainment device, Internet-of-Things (IoT) devices, or any device that can communicate with other wireless devices via more than one radio interface.

Figure 2:
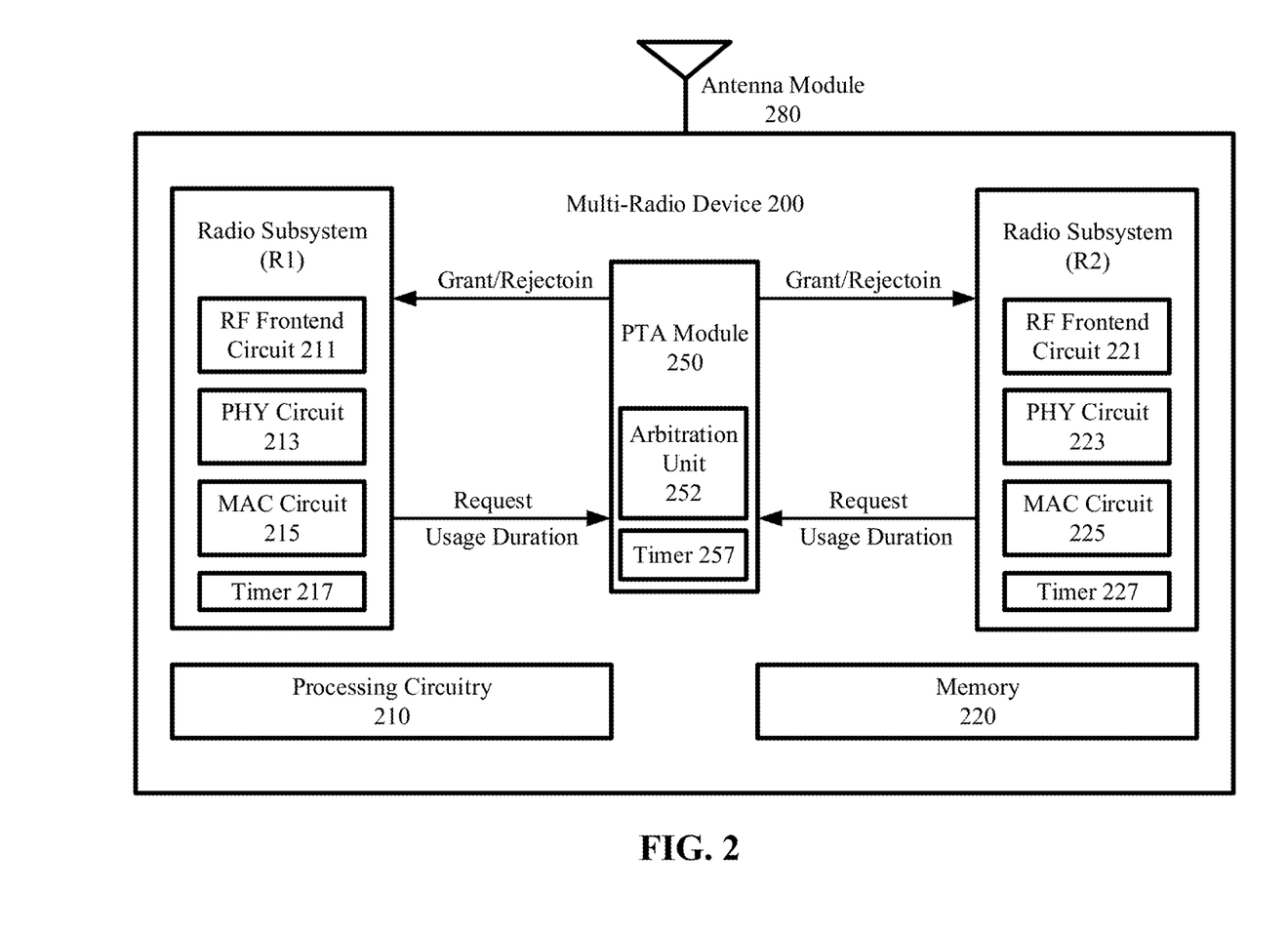
FIG. 2 is a block diagram illustrating a multi-radio device according to one embodiment.

FIG. 2 is a diagram illustrating a multi-radio device 200 according to one embodiment. An example of the multi-radio device 200 may be the wireless device 100 in FIG. 1. The multi-radio device 200 includes a PTA module 250 which further includes an arbitration unit 252 and a timer 257. The arbitration unit 252 arbitrates radio communication requests (e.g., for transmitting and/or receiving signals) from radio subsystems R1 and R2. For simplicity of illustration and description, only two radio subsystems are shown in FIG. 2. It is understood that the multi-radio device 200 may include any number (e.g., more than two) of radio subsystems. The arbitration unit 252 may be a special-purpose hardware circuit specialized to perform the operations and methods to be disclosed with reference to FIGS. 3A, 3B, 5 and 6. In an alternative embodiment, the arbitration unit 252 includes a processor and memory, which stores or loads instructions executable by the processor to perform the operations and methods to be disclosed with reference to FIGS. 3A, 3B, 5 and 6. The timer 257 keeps track of the remaining usage duration of a granted radio subsystem.

In one embodiment, the radio subsystem R1 includes an RF frontend circuit 211 which further includes power amplifier for signal transmission, low-noise amplifier (LNA) for signal reception, clock circuit, signal filters, and analog signal processing circuit, etc. The radio subsystem R1 further includes a PHY circuit 213 to provide physical layer functionalities, which are associated with error detection and correction, interleaving, rate matching, modulation/demodulation, etc. The radio subsystem R1 further includes a MAC circuit 215 to provide MAC layer functionalities, which are associated with link management, frame assembly and de-assembly, error detection and correction, etc. The functionalities of the PHY circuit 213 and the MAC circuit 215 may be different from what is mentioned above for different wireless communication protocols. The radio subsystem R1 further includes a timer 217 to keep track of the remaining usage time of another radio subsystem granted to perform radio communication.

Similarly, the radio subsystem R2 includes an RF frontend circuit 221, a PHY circuit 223, and a MAC circuit 225, which perform functionalities analogous to those of the RF frontend circuit 211, the PHY circuit 213, and the MAC circuit 215, respectively. The radio subsystem R2 further includes a timer 227 to keep track of the remaining usage time of another radio subsystem t granted to perform radio communication. It is understood that, in alternative embodiments, the radio subsystems R1 and R2 may include additional or different circuitry not described herein.

In one embodiment, each radio subsystem R1 or R2 sends a request to the PTA module 250 before transmitting or receiving signals. The request indicates a usage duration. For example, when the radio subsystem R2 has a set of packets to transmit, R2 may send a request to the PTA module 250 with a usage duration, which is the time period for transmitting the set of packets. The PTA module 250 grants this request if R1 is not active, or reject this request if R1 is active. If R2's request is rejected, R2 may enter a sleep mode to reduce power consumption. In one embodiment, when a radio subsystem (e.g., R2) enters the sleep mode, the RF frontend circuit 221 and the PHY circuit 223 may be turned off to conserve power. The MAC circuit 225 may stay on to retain the current state, such that no backup or restoration is necessary.

The multi-radio device 200 further includes an antenna module 280 to transmit signals to and receive signals from another station in a radio access network. In one embodiment, the antenna module 280 may be shared by the radio subsystems R1 and R2; in an alternative embodiment, the radio subsystems R1 and R2 may each have its own antenna module. The multi-radio device 200 further includes a processing circuitry 210, which may include one or more control processors, signal processors, central processing units, cores, and/or processor cores programmable to execute instructions stored in a memory 220 to perform computing and/or communication functions of the multi-radio device 200. The multi-radio device 200 may be incorporated into a wireless system, a station, a terminal, a device, an appliance, a machine, and IoT operable to perform wireless communication.

In one embodiment, the multi-radio device 200 may store and transmit (internally and/or with other electronic devices over a network) code (composed of software instructions) and data using computer-readable media, such as non-transitory tangible computer-readable media (e.g., computer-readable storage media such as magnetic disks; optical disks; read-only memory; flash memory devices) and transitory computer-readable transmission media (e.g., electrical, optical, acoustical or other forms of propagated signals). For example, the memory 220 and/or the PTA module 250 may include a non-transitory computer-readable storage medium that stores computer-readable program code. The code, when executed by the processors, causes the processors to perform operations according to embodiments to be disclosed herein.

Although the multi-radio device 200 is used in this disclosure as an example, it is understood that the methodology described herein is applicable to any computing and/or communication device capable of performing multi-radio communications.

Figure 3A:
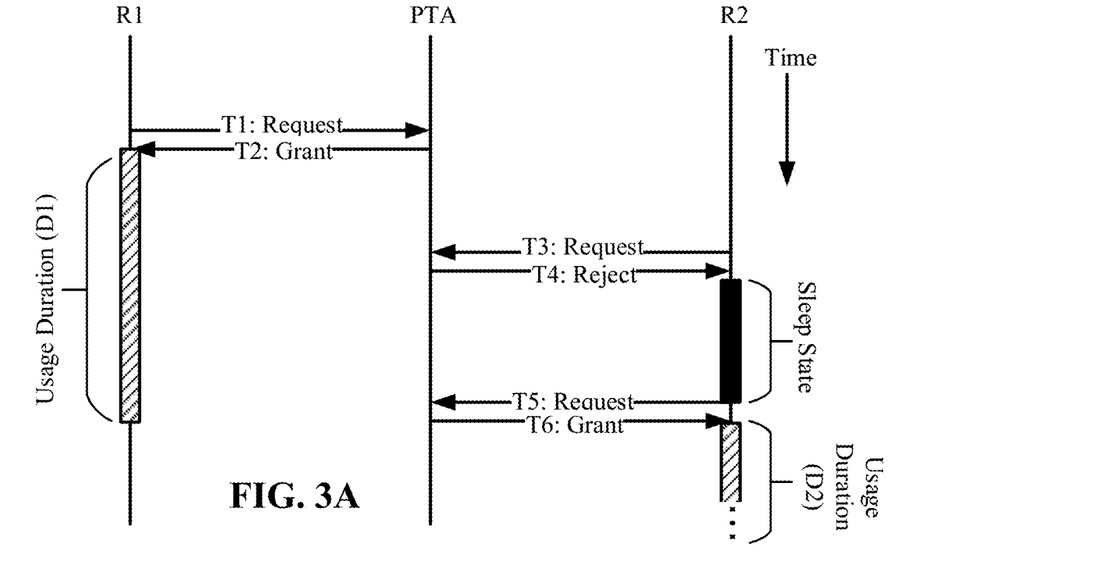
FIG. 3A is a timing diagram illustrating interactions among a packet traffic arbitration (PTA) module and two radio subsystems according to one embodiment.

FIG. 3A is a timing diagram illustrating interactions among the PTA module 250 and the radio subsystems R1 and R2 according to one embodiment. The vertical lines in the timing diagram represent the time axis. At time T1, the radio subsystem R1 sends a request to the PTA module 250 to transmit or receive for a usage duration D1. The request may also indicate the direction of communication (e.g., transmission or reception) and a priority level. In one embodiment, a request of a higher priority level may preempt an ongoing radio communication of a lower priority level, to cause the lower-priority communication to terminate earlier than the granted usage duration.

At time T2, the PTA module 250 grants the request from the radio subsystem R1 and R1's usage duration. Upon receiving the grant, the radio subsystem R1 becomes active to perform transmission or reception of a set of packets. The timer in the PTA module 250 keeps track of the remaining time in R1's usage duration. At time T3, the radio subsystem R2 sends a request to the PTA module 250 for a usage duration (D2). The PTA module 250 rejects this request at time T4, because of R1's usage duration has not ended. The PTA module 250 sends a rejection to R2 along with the remaining time in R1's usage duration at that moment. Upon receiving the rejection, the radio subsystem R2 enters a sleep mode. If R2's request is to transmit packets, R2 may store the packets in a memory buffer when entering the sleep mode. R2 keeps a timer to keep track of the remaining time in R1's usage duration. When R1's usage duration reaches the end or near the end (e.g., K milliseconds before the end, where K is a configurable value), at time T5 the radio subsystem R2 re-submits a request to the PTA module 250 for the usage duration (D2). The PTA module 250 grants this request once R1's usage duration ends at time T6. R2 becomes active when receiving the grant.

Figure 3B:
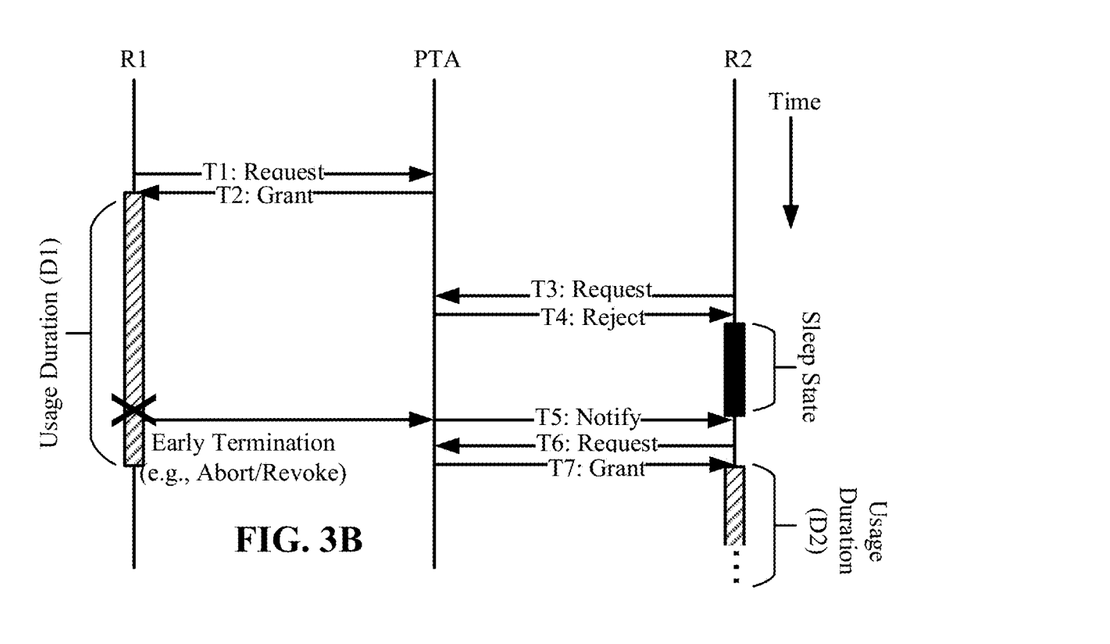
FIG. 3B is a timing diagram illustrating interactions among a packet traffic arbitration module and radio subsystems according to another embodiment.

FIG. 3B is a timing diagram illustrating interactions among the PTA module 250 and the radio subsystems R1 and R2 according to another embodiment. The operations and interactions at times T1-T4 are the same as in FIG. 3A. In this example, the radio communication of R1 terminates before the end of the granted usage duration (D1). The early termination may be caused by R1 aborting the communication, or by the PTA module 250 revoking the grant. The PTA module 250 keeps tracks of which radio subsystem(s) was rejected during R1's usage duration; in this case, it is R2. Thus, the PTA module 250 notifies R2 at time T5 to wake up R2 from the sleep mode. In response to the notification, R2 re-submits its request to the PTA module 250 at time T6 for the usage duration (D2). At time T7, the PTA module 250 grants R2's request, and R2 becomes active.

Figure 4A:
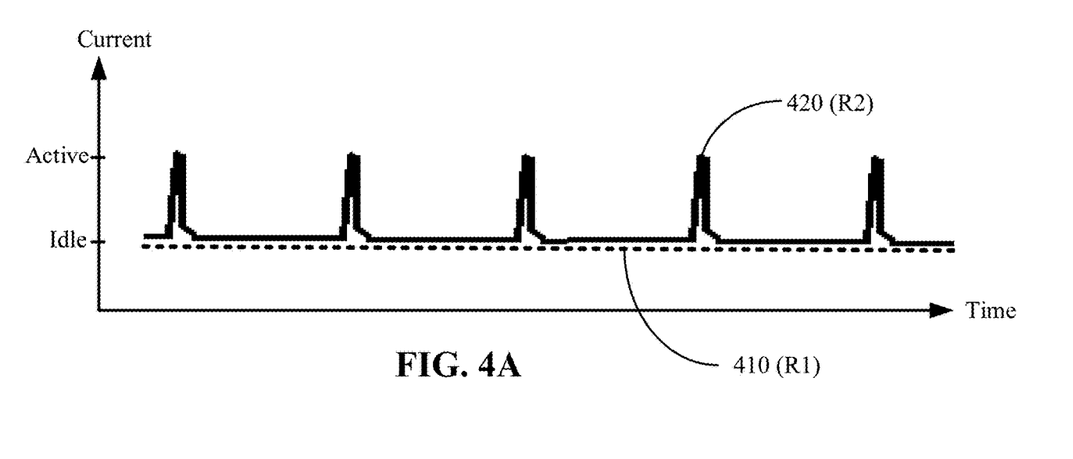
FIG. 4A is a diagram illustrating an example of electric current profiles of radio subsystems according to one embodiment.

FIG. 4A is a diagram illustrating an example of electric current profiles of the first radio subsystem R1 and the second radio subsystem R2 according to one embodiment. The current profiles 410 (solid line) and 420 (dotted line) show the amount of current consumed by R1 and R2, respectively, due to their activity or inactivity over time. In this example, the second radio subsystem R2 is active periodically, and the first radio subsystem R1 is idle (i.e., has nothing to transmit or receive). A radio subsystem in the idle mode is analogous to standby, in which the radio subsystem is waiting to receive a signal or notification to become active. The active mode has a higher current consumption than the idle mode, and the idle mode has a higher current consumption than the sleep mode.

Figure 4B:
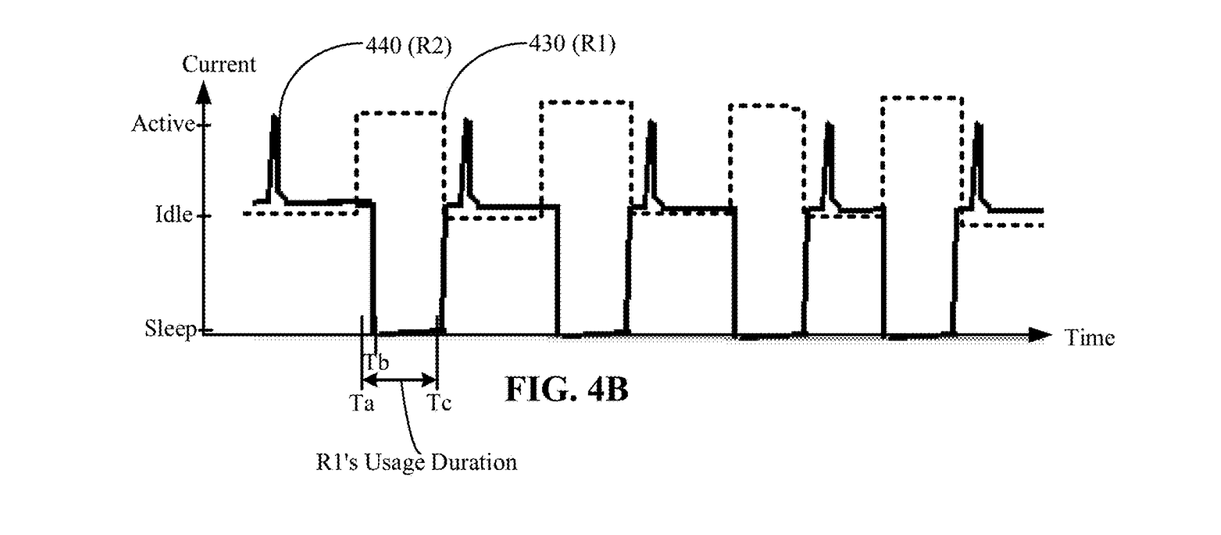
FIG. 4B is a diagram illustrating another example of electric current profiles of radio subsystems according to one embodiment.

FIG. 4B is a diagram illustrating another example of electric current profiles of the first radio subsystem R1 and the second radio subsystem R2 according to one embodiment. The current profiles 430 (solid line) and 440 (dotted line) show the amount of current consumed by R1 and R2, respectively, due to their activity or inactivity over time. In this example, both the first radio subsystem R1 and the second radio subsystem R2 are active periodically. The radio subsystem (R1 or R2) is in the idle mode when it has nothing to transmit or receive. At time Ta, R1 becomes active (to transmit or receive) after being granted by the PTA module 250 for a usage duration. At time Tb, R2's request is rejected and R2 enters the sleep mode. At time Tc, R1's usage duration ends, and R2 wakes up from the sleep mode to request for radio communication.

In the examples of FIG. 4A and FIG. 4B, the radio communication performed by the radio subsystems R1 and R2 are periodic. However, embodiments of the invention apply to radio communication of R1 and R2 that may be aperiodic.

Although the aforementioned examples describe a multi-radio device including two radio subsystems R1 and R2, it is understood that a multi-radio device according to embodiments of the invention may include multiple radio subsystems R1, R2, . . . , RN coupled to the PTA module 250, where N is an integer greater than two. The operations of the PTA module 250 described above with reference to FIGS. 2, 3A and 3B are applicable to any number of radio subsystems in a multi-radio device.

Figure 5:
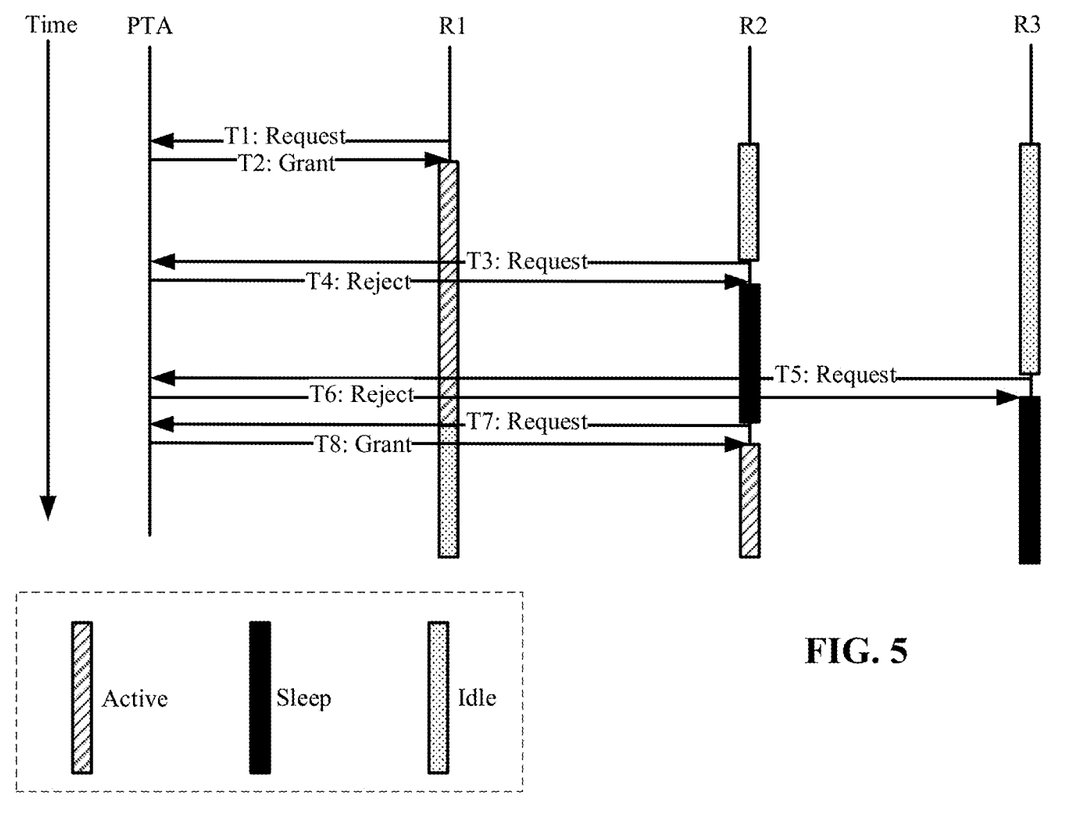
FIG. 5 is a timing diagram illustrating interactions among a PTA module and three radio subsystems according to one embodiment.

FIG. 5 is a timing diagram illustrating interactions among the PTA module 250 and radio subsystems R1, R2 and R3 according to one embodiment. Although three radio subsystems are shown, it is understood that the interactions disclosed herein are applicable to any number of radio subsystems in a multi-radio device. In FIG. 5, the block with a slanted-line pattern represents the active mode, the solid-black block represents the sleep mode, and the block with a dotted pattern represents the idle mode.

At time T1, the radio subsystem R1 sends a request to the PTA module 250 to transmit or receive for a usage duration D1. At time T2, the PTA module 250 grants R1's request. At time T3, the radio subsystem R2 sends a request to the PTA module 250 to transmit or receive for a usage duration D2. At time T4, the PTA module 250 rejects this request and R2 enters the sleep mode. At time T5, the radio subsystem R3 sends a request to the PTA module 250 to transmit or receive for a usage duration D3. At time T6, the PTA module 250 rejects this request and R3 enters the sleep mode. At time T7 when R1's usage duration D1 ends, the radio subsystem R2 re-submits its request to the PTA module 250 to transmit or receive for the usage duration D2. The PTA module 250 grants this request at time T8, at which time R2 becomes active. If at time T7 the radio subsystem R3 also re-submits its request to the PTA module 250 to transmit or receive for the usage duration D3, the PTA module 250 may grant the request that has a higher priority. For example, if R2 has a higher priority than R3, R3 enters the sleep mode when R2 receives the grant to be active.

Figure 6:
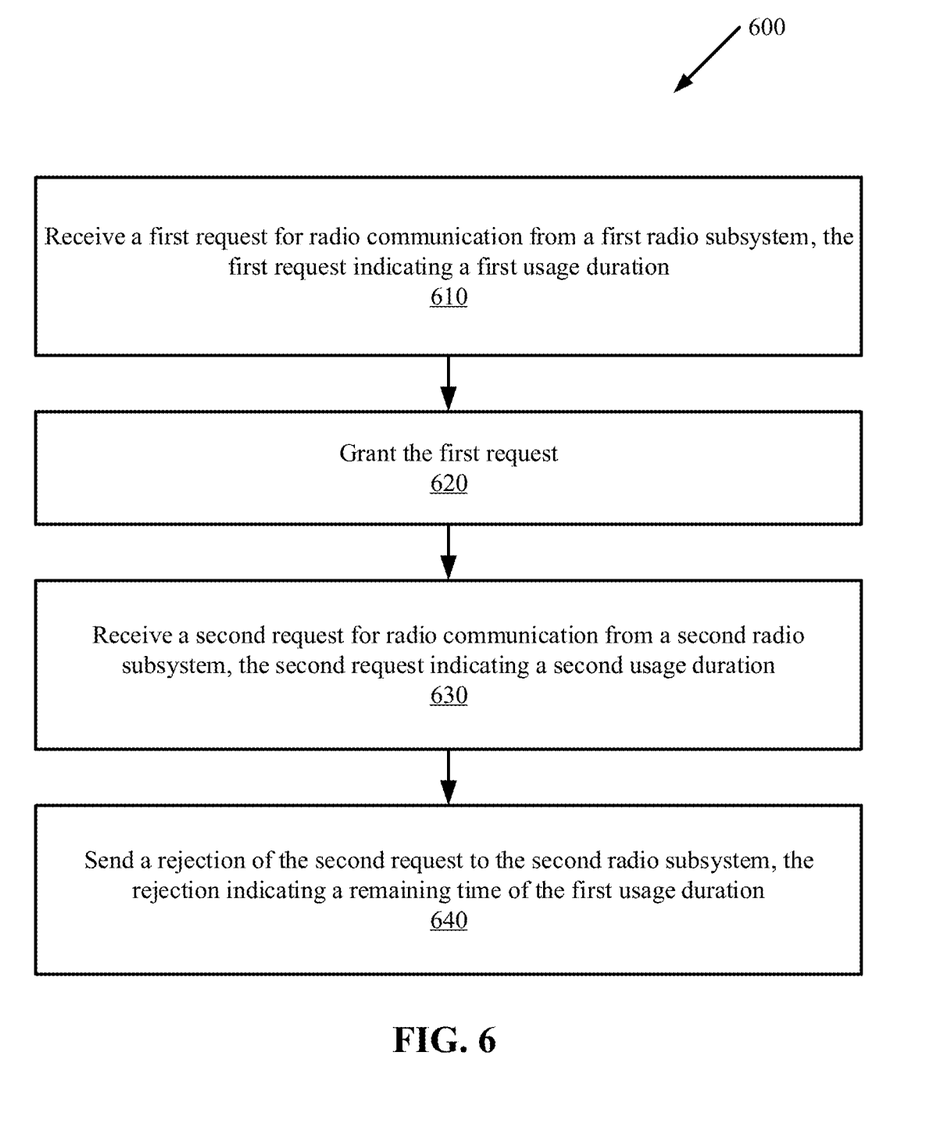
FIG. 6 is a flow diagram illustrating a method performed by a multi-radio device according to one embodiment.

FIG. 6 is a flow diagram illustrating a method 600 performed by a multi-radio device according to one embodiment. The device includes a PTA module and two or more radio subsystems. The two or more radio subsystems may operate in a WLAN and a WPAN, among other wireless networks. In one embodiment, the device may be the wireless device 100 in FIG. 1 and/or the multi-radio device 200 in FIG. 2. The PTA module may be the PTA module 250 in FIG. 2; it is understood that the multi-radio device 200 may include two or more radio subsystems.

The method 600 starts at step 610 when the PTA module receives a first request for radio communication from a first radio subsystem, the first request indicating a first usage duration. At step 620 the PTA module grants the first request. Upon receiving the grant, the first radio subsystem starts the requested radio communication, such as transmit or receive a set of packets. At step 630, the PTA module receives a second request for radio communication from a second radio subsystem, the second request indicating a second usage duration. At step 640, the PTA module sends a rejection of the second request to the second radio subsystem, the rejection indicating a remaining time of the first usage duration. In one embodiment, after receiving the rejection, the second radio subsystem enters a sleep mode.

The operations of the flow diagram of FIG. 6 has been described with reference to the exemplary embodiments of FIGS. 1 and 2. However, it should be understood that the operations of the flow diagram of FIG. 6 can be performed by embodiments of the invention other than the embodiments of FIGS. 1 and 2, and the embodiments of FIGS. 1 and 2 can perform operations different than those discussed with reference to the flow diagram. While the flow diagram of FIG. 6 shows a particular order of operations performed by certain embodiments of the invention, it should be understood that such order is exemplary (e.g., alternative embodiments may perform the operations in a different order, combine certain operations, overlap certain operations, etc.).

Various functional components or blocks have been described herein. As will be appreciated by persons skilled in the art, the functional blocks will preferably be implemented through circuits (either dedicated circuits, or general-purpose circuits, which operate under the control of one or more processors and coded instructions), which will typically comprise transistors that are configured in such a way as to control the operation of the circuitry in accordance with the functions and operations described herein.

While the invention has been described in terms of several embodiments, those skilled in the art will recognize that the invention is not limited to the embodiments described, and can be practiced with modification and alteration within the spirit and scope of the appended claims. The description is thus to be regarded as illustrative instead of limiting.

What is claimed is:

1. A multi-radio device, comprising:
two or more radio subsystems; and
a packet traffic arbitration (PTA) circuit coupled to the two or more radio subsystems, the PTA circuit operative to:
  receive a first request for radio communication from a first radio subsystem, the first request indicating a first usage duration;
  grant the first request;
  receive a second request for radio communication from a second radio subsystem, the second request indicating a second usage duration; and
  send a rejection of the second request to the second radio subsystem, the rejection informing a remaining time in the first usage duration,
  wherein the second radio subsystem is operative to enter a sleep mode when receiving the rejection, and the second radio subsystem enters the sleep mode by turning off a portion of circuitry and keeping a media access control (MAC) circuitry on.

2. The multi-radio device of claim 1, wherein the second radio subsystem enters the sleep mode by turning off a radio frequency (RF) circuit and a physical layer (PHY) circuitry.

3. The multi-radio device of claim 1, wherein the second radio subsystem is operative to send a subsequent request to the PTA circuit for the RF communication when the remaining time ends.

4. The multi-radio device of claim 1, wherein a timer circuit of the second radio subsystem is operative to track the remaining time of the first usage duration.

5. The multi-radio device of claim 1, wherein the PTA circuit is operative to send to the second radio subsystem a notification of early termination of the first usage duration, and the second radio subsystem wakes up from the sleep mode when receiving the notification.

6. The multi-radio device of claim 1, wherein each radio subsystem is in an idle mode when the radio subsystem has nothing to transmit and nothing to receive.

7. The multi-radio device of claim 1, wherein the two or more radio subsystems operate in at least a wireless personal area network (WPAN) and a wireless local area network (WLAN).

8. The multi-radio device of claim 1, wherein each of the first request and the second request further indicates a requested communication direction, which is one of transmission and reception, and a priority level.

9. A method performed by a device including a packet traffic arbitration (PTA) module and two or more radio subsystems, comprising:
receiving a first request for radio communication from a first radio subsystem by the PTA module, the first request indicating a first usage duration;
granting the first request by the PTA module;
receiving a second request for radio communication from a second radio subsystem by the PTA module, the second request indicating a second usage duration; and
sending a rejection of the second request to the second radio subsystem, the rejection informing a remaining time in the first usage duration,
wherein the second radio subsystem is operative to enter a sleep mode when receiving the rejection, and the second radio subsystem enters the sleep mode by turning off a portion of circuitry and keeping a media access control (MAC) circuitry on.

10. The method of claim 9, wherein the second radio subsystem enters the sleep mode by turning off a radio frequency (RF) circuit and a physical layer (PHY) circuitry.

11. The method of claim 9, further comprising:
sending a subsequent request from the second radio subsystem to the PTA module for the RF communication when the remaining time ends.

12. The method of claim 9, further comprising:
using a timer of the second radio subsystem to track the remaining time of the first usage duration.

13. The method of claim 9, further comprising:
sending, from the PTA module to the second radio subsystems, a notification of early termination of the first usage duration; and
waking up the second radio subsystem from the sleep mode when the second radio subsystem receives the notification.

14. The method of claim 9, wherein each radio subsystem is in an idle mode when the radio subsystem has nothing to transmit and nothing to receive.

15. The method of claim 9, wherein the two or more radio subsystems operate in at least a wireless personal area network (WPAN) and a wireless local area network (WLAN).

16. The method of claim 9, wherein each of the first request and the second request further indicates a requested communication direction, which is one of transmission and reception, and a priority level.

* * * * *